(12) United States Patent
Geiss

(10) Patent No.: US 7,128,800 B2
(45) Date of Patent: Oct. 31, 2006

(54) VACUUM FORMING MACHINE

(75) Inventor: Manfred Geiss, Sesslach (DE)

(73) Assignee: Geiss AG, Germany (DE)

( * ) Notice: Subject to any disclaimer, the term of this patent is extended or adjusted under 35 U.S.C. 154(b) by 0 days.

(21) Appl. No.: 10/905,651

(22) Filed: Jan. 14, 2005

(65) Prior Publication Data

US 2005/0155715 A1    Jul. 21, 2005

(30) Foreign Application Priority Data

Jan. 16, 2004   (DE)   ............... 10 2004 002 431

(51) Int. Cl.
*B32B 37/00* (2006.01)

(52) U.S. Cl. ............ 156/269; 156/285; 156/292; 156/494; 156/510; 264/545; 425/388; 425/504

(58) Field of Classification Search ............ 156/285, 156/381, 382, 499, 500, 501, 556, 557, 580, 156/581, 583.1, 229, 269, 510; 264/544, 264/545; 425/388, 504, 508
See application file for complete search history.

(56) References Cited

U.S. PATENT DOCUMENTS 5,500,067 A   3/1996   Jenkner 6,372,176 B1 *   4/2002   Ekendahl et al. ............ 264/545

FOREIGN PATENT DOCUMENTS

| DE | 24 27 311 | 12/1975 |
| EP | 0 571 897 A1 | 12/1993 |
| EP | 0 761 412 A1 | 3/1997 |

* cited by examiner

*Primary Examiner*—James Sells
(74) *Attorney, Agent, or Firm*—Moore & Van Allen PLLC; Michael G. Johnston

(57) ABSTRACT

A vacuum forming machine and a method of manufacturing a duplex twin-sheet element from two continuous webs of thermoplastic material conveyed in parallel by means of a twin-sheet frame provided therebetween, which is adapted to be loaded by means of a tensioning frame for creating closed machine chambers with the material web sections to be shaped, provides for the aspect that the twin-sheet frame is provided with a front frame section in the front along the conveying direction of said material webs, which frame section can be removed for de-moulding said twin-sheet element. The material webs are conveyed in a cycled operation when the twin-sheet frame is not loaded and open in the conveying direction, and for forming a twin-sheet element, the twin-sheet frame is closed and loaded by the tensioning frame.

16 Claims, 5 Drawing Sheets

VACUUM FORMING MACHINE

The invention relates to a vacuum forming machine provided with a closed machine housing for manufacturing a duplex hollow body or twin-sheet element constituted by two continuous thermoplastic webs of material conveyed in parallel by means of a spacer or twin-sheet frame disposed therebetween, which is adapted for being loaded by means of a tensioning frame for creating closed machine chambers with the sections of material web to be formed, as well as to a method of manufacturing such a duplex hollow body or twin-sheet element by using such a vacuum forming machine.

Vacuum forming machines serve to shape thermoplastic material blanks or material webs using a vacuum. A so-called twin-sheet method is known for the production of hollow bodies, wherein two material blanks or material webs are processed at the same time, with the heat of the heated thermoplastic blanks being utilised after the production of two spherical shells in order to connect these two spherical shells without additional welding or adhesive bonding in an efficient and environmentally acceptable manner. In relation to vacuum forming and welding of the two material blanks or sections of material web, which are usually tensioned in a vertically superimposed relationship, it is common to provide a spacer or twin-sheet frame between them in order to maintain the material sections or sections of the material web at a defined distance.

The twin-sheet method according to prior art is usually realised in an open machine housing with the introduction of the material webs into so-called needle chains and their cycled transfer through one or several heating zones in succession. After the thermoplastic material webs have been heated, they are introduced into the forming station and an upper mould and a lower mould are moved together there whereupon the twin-sheet element is shaped as a hollow body. The aspect that must be considered to be a disadvantage of such multi-station machines is the fact that the thermoplastic material blanks or sections of material web are expanded when heated and more or less sag under their own weight, so that only materials with a low sagging tendency can be employed and/or small mouldings can be produced only. With such machines with an open machine housing or open-chamber machines, it is impossible, in an expedient way, to compensate for the sagging of the materials to be formed, which is caused by gravity.

Sagging control is possible with so-called single-station machines or with machines provided with a closed machine housing or closed-chamber machines, with these known machines, however, being configured only in the form of panel-producing machines operating on separate blanks of material.

The present invention is based on the problem of providing a vacuum forming machine, as well as a method of manufacturing a twin-sheet element of the type defined by way of introduction, which permits material-sagging control of both material webs during the heating operation and the pre-forming operation for the continuous and low-cost manufacture of twin-sheet elements of major size.

The invention utilises expediently a vacuum forming machine for the manufacture of duplex mouldings or hollow mouldings or twin-sheet elements with one closed machine housing being provided for both material webs. The twin-sheet frame must merely be relieved of its load for conveying the material webs, and merely that frame section, which is preferably the front frame section along the conveying direction of the material webs, must be removed for de-moulding of the twin-sheet element. Preferably, lateral extension of the front frame section takes place whereupon the twin-sheet element in a continuous strip can be discharged out of the twin-sheet frame though a conveyor device, preferably in the form of needle chains provided in pairs, acting up to the front frame section and can be severed by means of a cutting means.

It is expedient to provide four needle chain bar arrays, which operate in two pairs, with one pair of needle chain bar arrays conveying the upper material web whilst a second pair conveys the lower material web or material sheet. The arrangement is so made that those needle chain bar arrays terminate each ahead of the front frame section in order to allow for a lateral extension of the front frame section.

The realisation of the method requires that, when the material webs are conveyed, a twin-sheet frame disposed between the webs be relieved of the load, whilst the needle chains may firmly be supported on the material webs. For the thermoforming process, proper provisions are made for a downward movement of the tensioning frame, which is provided above the twin-sheet frame, thus tensioning both material webs and the twin-sheet frame and creating two closed machine chambers. The first machine chamber is formed by a stationary window plate provided in the shaping station in relation to the lower material web, whereas the second closed machine chamber is created by the lower material web, the lower needle chain bar arrays, the closed twin-sheet frame and the upper material web.

In the following, the invention will now be described in more details, with reference to the annexed Figures wherein.

Figure 1:
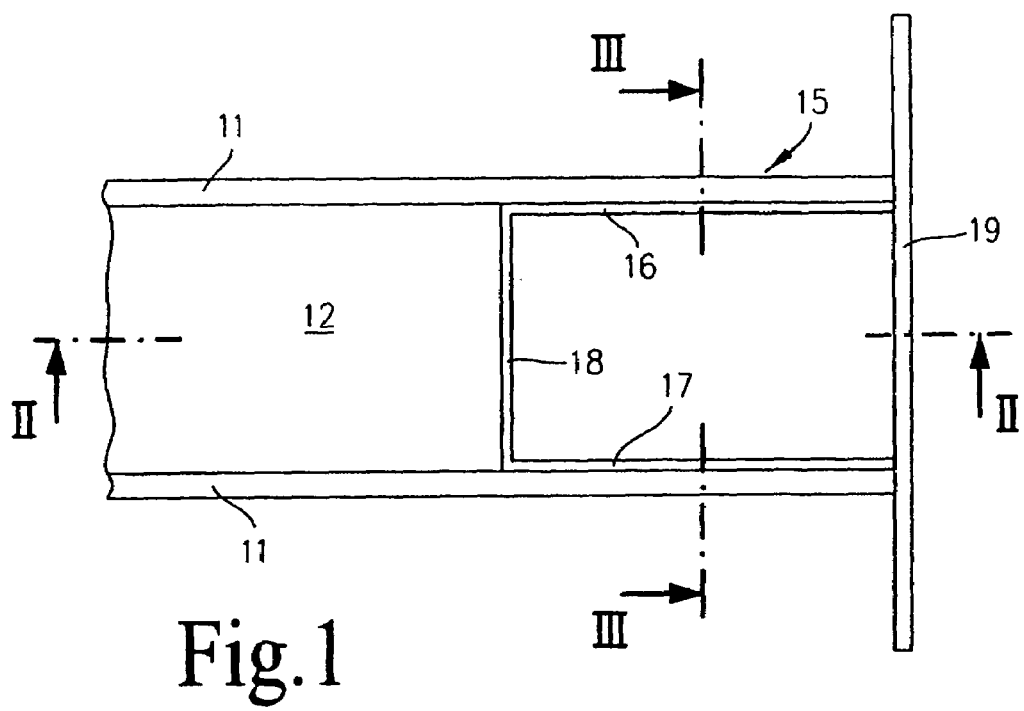
Figure 2:
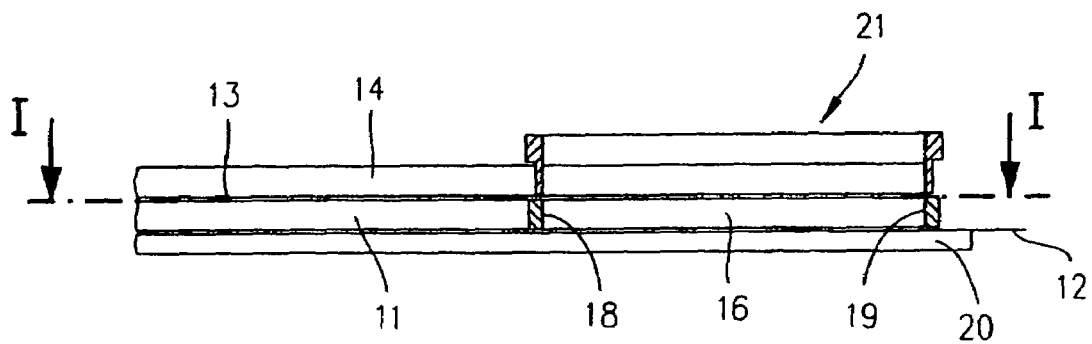
Figure 3:
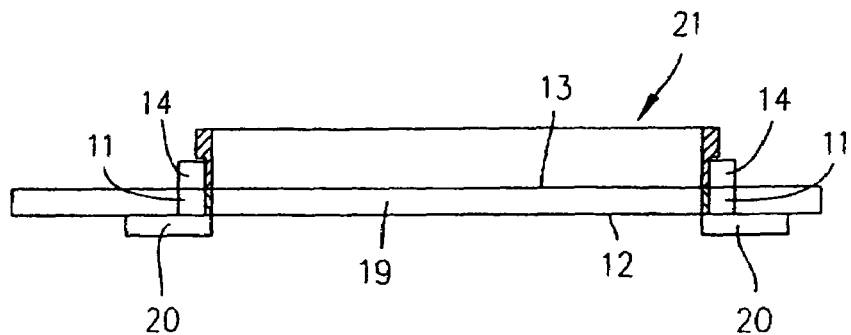
FIG. 3 is a schematic sectional view along the sectional line III—III in FIG. 1.

FIGS. 1 to 3 show schematic views of processing zone sections of an inventive vacuum forming machine. A lower pair of needle chain bar arrays 11 for conveying a lower tensioned material web 12 is mounted above the material web 12 only on the sides. A tensioned upper material web 13 is arranged in parallel and spaced from the lower tensioned material web 12, with an upper pair of needle chain bar arrays 14 being provided on both sides above the upper material web 13. The needle chain bar arrays 11 and 14 prick each into the material webs 12 or 13, respectively, from the top and convey the respective material web 12 or 13 along the lower edge of the respective needle chain.

A twin-sheet frame 15 is arranged between the material webs 12 and 13. The twin-sheet frame 15 has a rectangular configuration and consists of two solid opposite side sections 16 and 17, a rear-side frame section 18 connecting the side sections 16 and 17 and a front frame section 19 connecting the side sections 16 and 17 and located in front along the conveying direction of the material webs. The frame sections 16, 17 and 18 are stationary and mounted between the material webs 12 and 13 between the material webs 12 and 13 whereas the front frame section 19 can be moved to the side for releasing the entire cross-sectional part within the twin-sheet frame 15, as will be still explained in the following. The front frame section 19 extends beyond both sides of the twin-sheet frame 15, and the needle chain bar arrays 11 and 13 terminate directly ahead of the front frame section 19.

A window plate 20 is arranged underneath the lower material web 12, and a tensioning frame 21 is located above the upper tensioned material web 13 The tensioning frame 21 presents the same format as the twin-sheet frame 15. The tensioning frame 21 can be slightly raised from a position urging the upper material web 13, the twin-sheet frame 15 and the lower material web 12 against the window plate 20 for relieving the load for conveying the preceding material webs out of the shaping station. The tensioning frame 21 can then be lowered for loading in order to realise the next shaping operation.

Figure 4:
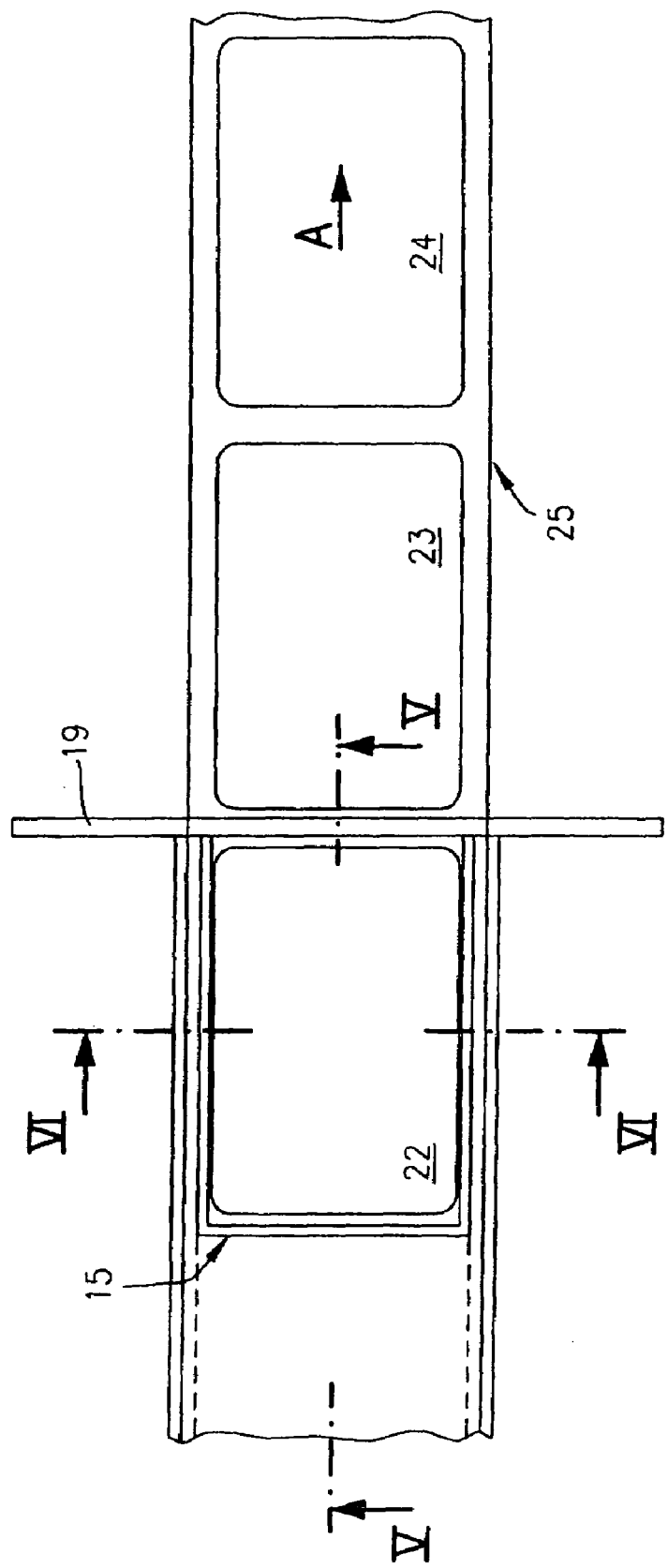
FIG. 4 is a schematic plan view similar to FIG. 1 along the sectional line IV—IV in FIG. 5, showing a roughly indicated material web with shaped and welded twin-sheet elements.
Figure 5:
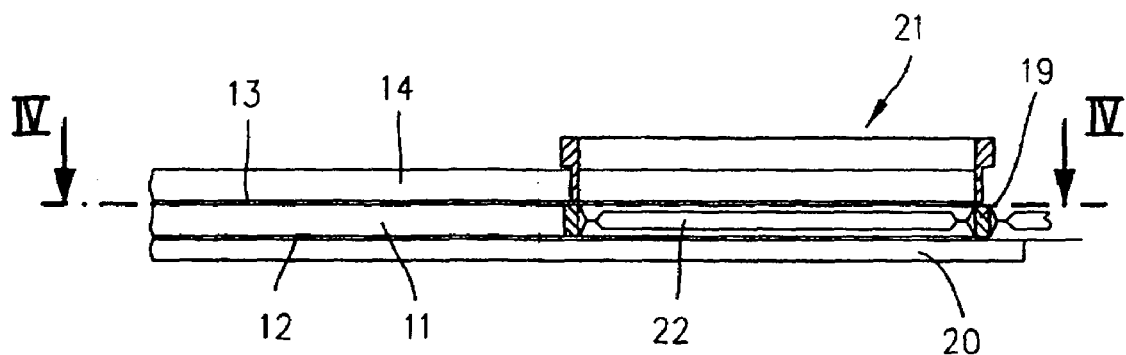
FIG. 5 shows a schematic sectional view along the sectional line V—V in FIG. 4.
Figure 6:
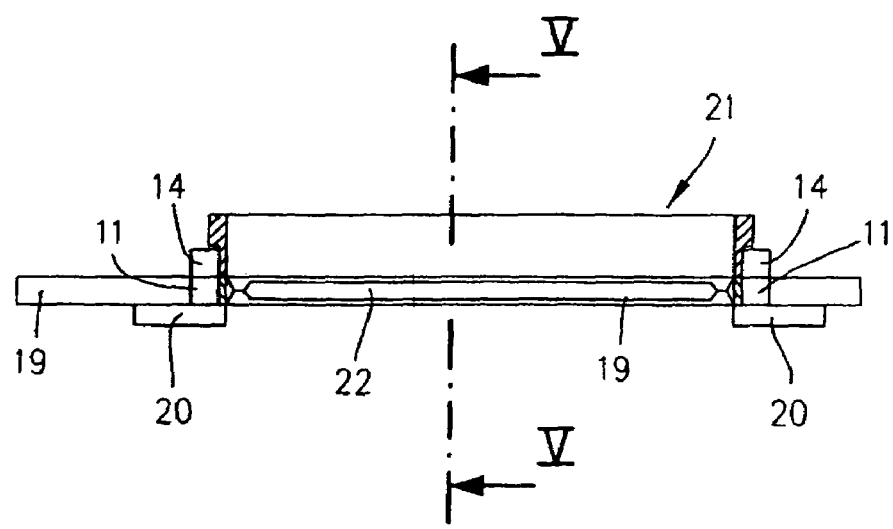
FIG. 6 is a schematic sectional view along the sectional line VI—VI in FIG. 4.

FIGS. 4 to 6, which complete the FIGS. 1 to 3, show a material web with pre-shaped and welded twin-sheet elements 22 to 24 for illustrating the production of the twin-sheet elements in one continuous strip 25, with the front frame section 19 of the twin-sheet frame 15 still being in a position closing the twin-sheet frame 15. The strip 25 and the material webs 12 and 13 move in a cyclic movement along a conveying direction A, with the period of one cycle being defined by the spacing between the individual twin-sheet elements 22 to 24.

Figure 7:
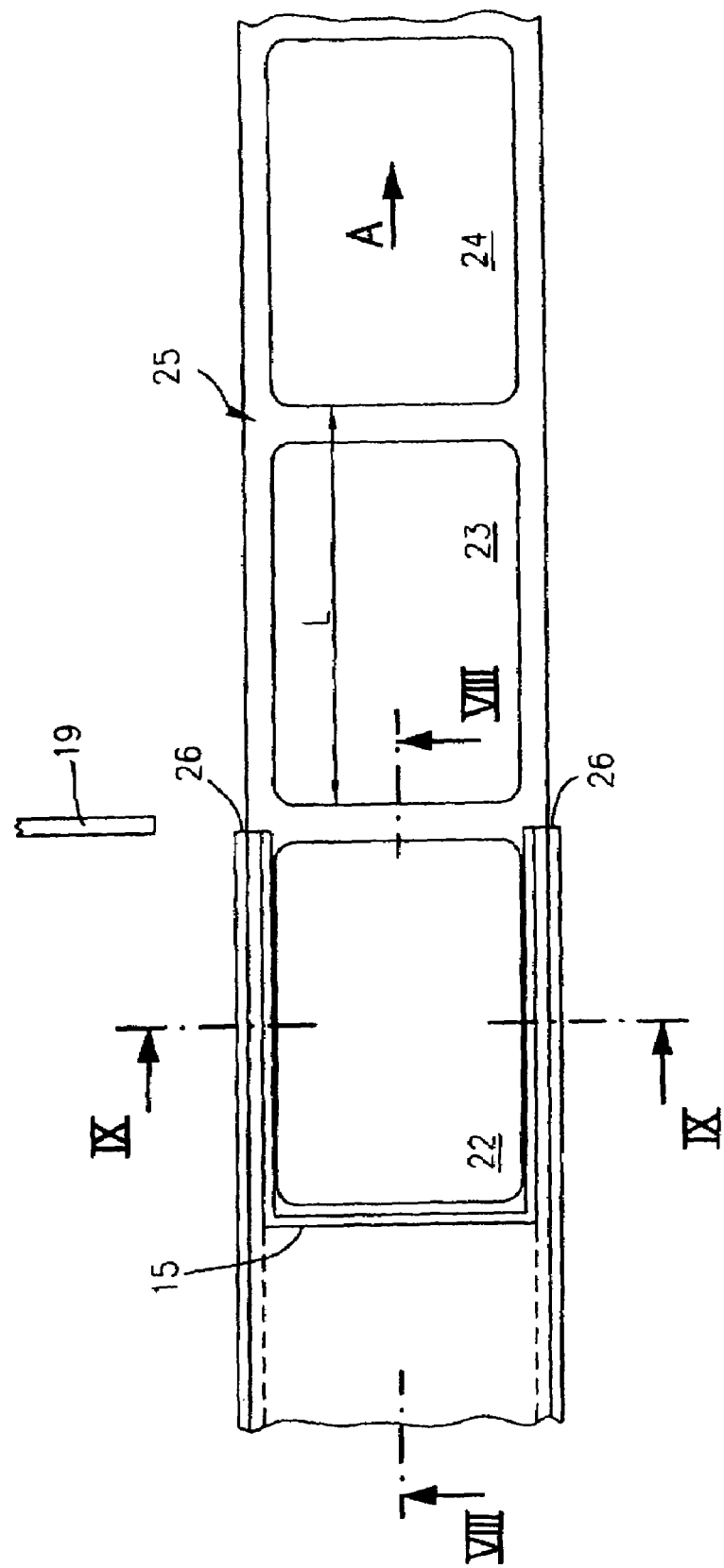
FIG. 7 is a schematic plan view similar to FIG. 4 along the sectional line VII—VII in FIG. 8, however with a laterally extended twin-sheet frame section located in front along the conveying direction of the material webs.
Figure 8:
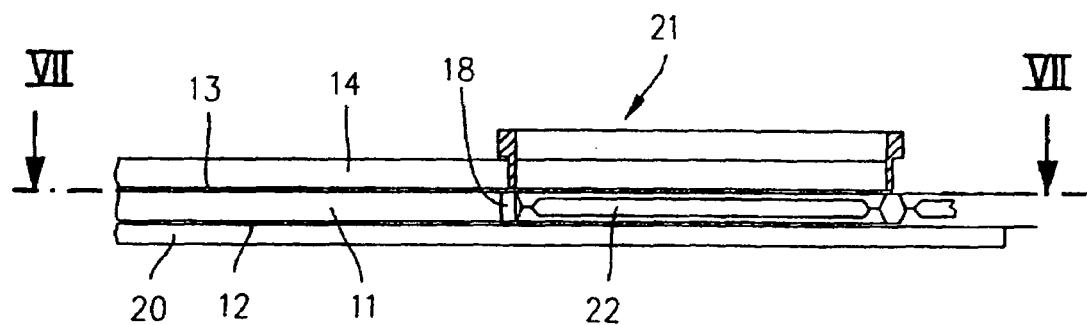
FIG. 8 illustrates a schematic sectional view along the sectional line VIII—VIII in F*ig*. 7.
Figure 9:
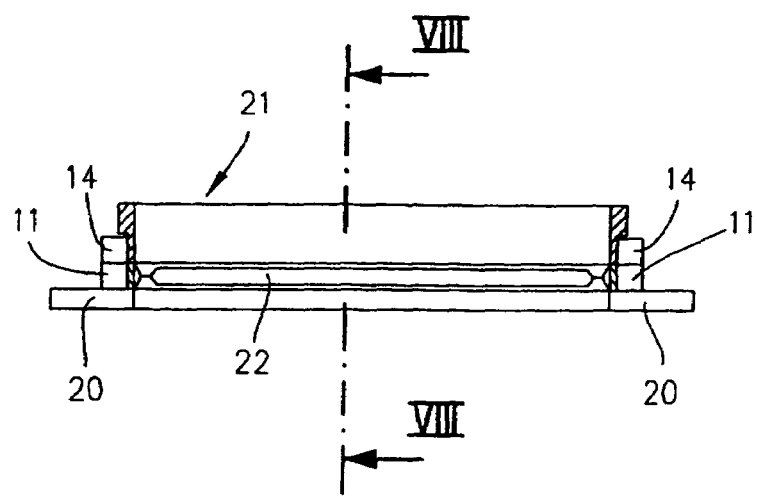
FIG. 9 is a schematic sectional view along the sectional line IX—IX in FIG. 7.

The illustrations in FIGS. 7 to 9 are distinguished from the FIGS. 4 to 6 only by the provision that the front frame section 19 is laterally moved out of the zone between the front ends 26 of the upper and lower needle chain bar pairs 11 and 14. The strip 25 with the twin-sheet elements 22 to 24 is now ready for a continuing transport by the corresponding length L along the direction A for pre-forming the next twin-sheet element by vacuum. The lateral extension of the front frame section 19 is preferably carried out by pneumatic means; however it may also be carried out by means of a motor or by hydraulic means.

The inventive vacuum forming machine operates on a process control system that controls the drives of the needle chain arrays 11, 14, the loading and load-relieving operations on the tensioning frame 21, the actual vacuum forming operation, the retraction and extension of the front frame section 19, the cycled operation and the severance of shaped twin-sheet elements 23, 24. The vacuum forming operation proper is carried out in a manner known per se while in the closed machine housing. The sagging of the material is controlled and possibly compensated during the heating and forming operations. The material webs are conveyed in a cycled manner while the twin-sheet frames 15 are relieved of any load and are open along the conveying direction A. As is roughly indicated in FIG. 7 for forming a twin-sheet element, the twin-sheet frame 15 is closed and loaded by the tensioning frame 21.

What is claimed is:

1. A vacuum forming machine for manufacturing a duplex twin-sheet element from first and second continuous webs of thermoplastic material, the vacuum forming machine comprising:
   means for conveying the material webs in a conveying direction parallel to each other;
   a twin-sheet frame disposed between the material webs, the twin-sheet frame comprising a plurality of frame sections defining an open interior and including a frame section that is movable relative to the other one or more frame sections such that the movable frame section can be moved for conveying the twin-sheet element out of the twin-sheet frame; and
   a tensioning frame movable between a first position where the tensioning frame is spaced from the material webs and a second position where the tensioning frame engages at least one of the material webs for loading the material webs and the twin-sheet frame and for creating closed chambers at least partially defined by sections of said thermoplastic material webs to be formed.

2. The vacuum forming machine according to claim 1, wherein said movable frame section is adapted to extend beyond the total width of said twin-sheet element to be formed.

3. The vacuum forming machine according to claim 1, wherein said movable frame section is adapted for being laterally extended relative to the remainder of the twin-sheet frame.

4. The vacuum forming machine according to claim 1, wherein said twin-sheet frame is disposed in a stationary arrangement.

5. The vacuum forming machine according to claim 1, wherein the means for conveying said material webs terminate upstream of said movable frame section along the conveying direction of said material webs.

6. The vacuum forming machine according to claim 1, wherein the means for conveying the material webs comprises a pair of needle chain bar arrays provided for each material web.

7. The vacuum forming machine according to claim 1, wherein each twin-sheet element constitutes one section of a continuous strip that can be pushed out of the vacuum forming machine after de-molding of said twin-sheet element.

8. The vacuum forming machine according to claim 7, wherein each twin-sheet element pushed out of the vacuum forming machine is adapted for being severed from said continuous strip by means of a cutting means.

9. A method of manufacturing a duplex twin-sheet element, the method comprising the steps of:
   providing two continuous webs of thermoplastic material;
   providing a twin-sheet frame between said material webs, the twin-sheet frame having an open condition for allowing the materials webs to be conveyed in the conveying direction and a closed condition for forming a twin-sheet element;
   providing a tensioning frame such that one of the material webs is conveyed between the tensioning frame and the twin-sheet frame, the tensioning frame movable between a first position where the tensioning frame is spaced from the material webs and a second position where the tensioning frame engages at least one of the material webs for loading the material webs and the twin-sheet frame and for creating closed chambers at least partially defined by sections of the thermoplastic material webs to be formed;
   conveying said material webs in said conveying direction when said twin-sheet frame is not loaded by the tensioning frame and is in the open condition;
   loading the material webs and the twin-sheet frame by moving the tensioning frame form the first position to the second position; and
   forming a twin-sheet element when said twin-sheet frame is in the closed condition and loaded by said tensioning frame.

10. The vacuum forming machine according to claim 1, wherein the movable frame section is the most downstream frame section along the conveying direction of the material webs.

11. The vacuum forming machine according to claim 6, wherein the pairs of needle chain bar arrays engage the upper surface of each material web.

12. The vacuum forming machine according to claim 6, wherein the pairs of needle chain bar arrays engage each material web adjacent the edges of the material web.

13. The vacuum forming machine according to claim 1, further comprising a stationary plate disposed such that the second material web is conveyed between the stationary plate and the twin-sheet frame.

14. The vacuum forming machine according to claim 13, wherein a first closed chamber is defined by the stationary plate and the lower surface of the second material web, and a second closed chamber is defined by the upper surface of the second material web, the pair of needle chain bar arrays operatively associated with the second material web, the twin-sheet frame and the lower surface of the first material web.

15. The method of manufacturing a duplex twin-sheet element according to claim 9, further comprising the step of severing the twin-sheet element from the continuous strip.

16. The method of manufacturing a duplex twin-sheet element according to claim 9, further comprising the steps of providing a stationary plate, conveying the second material web between the stationary plate and the twin-sheet frame wherein a first closed chamber is defined by the stationary plate and the lower surface of the second material web, and a second closed chamber is defined by the upper surface of the second material web, the pair of needle chain bar arrays operatively associated with the second material web, the twin-sheet frame and the lower surface of the first material web.

* * * * *